United States Patent
Hori et al.

[11] Patent Number: 5,879,073
[45] Date of Patent: Mar. 9, 1999

[54] VEHICULAR LAMP HAVING DISCHARGE BULB

[75] Inventors: Takashi Hori; Akiyoshi Ozaki; Shigeyuki Watanabe; Masahiro Kusagaya; Masatoshi Yoneyama, all of Shizuoka, Japan

[73] Assignee: Koito Manufacturing Co., Ltd., Tokyo, Japan

[21] Appl. No.: 787,931

[22] Filed: Jan. 23, 1997

[30] Foreign Application Priority Data

Jan. 29, 1996 [JP] Japan .................................. 8-012427
Jan. 29, 1996 [JP] Japan .................................. 8-087762

[51] Int. Cl.$^6$ .................................. B60Q 1/00; F21V 7/00
[52] U.S. Cl. .................... 362/344; 362/263; 362/265; 362/351; 362/353; 362/376; 362/377; 362/378; 362/459; 362/467; 362/487; 362/538; 362/539; 362/546; 362/549
[58] Field of Search ..................... 362/61, 263, 265, 362/344, 351, 353, 376, 377, 378, 386, 457, 459, 467, 487, 538, 539, 546, 549

[56] References Cited

U.S. PATENT DOCUMENTS

| | | | |
|---|---|---|---|
| 4,870,546 | 9/1989 | Hammerl et al. ......................... | 362/92 |
| 5,023,506 | 6/1991 | Canale et al. ............................ | 313/25 |
| 5,107,405 | 4/1992 | Makita ...................................... | 362/61 |
| 5,124,895 | 6/1992 | Segoshi et al. ......................... | 362/265 |
| 5,136,481 | 8/1992 | Dietzsch et al. ......................... | 362/61 |
| 5,188,444 | 2/1993 | Makita et al. ............................ | 362/80 |
| 5,243,501 | 9/1993 | Makita et al. ............................ | 362/61 |
| 5,258,686 | 11/1993 | Segoshi et al. ......................... | 313/313 |
| 5,343,370 | 8/1994 | Ohashi et al. ............................ | 362/61 |
| 5,382,876 | 1/1995 | Sugasawa et al. ......................... | 315/82 |
| 5,434,763 | 7/1995 | Hege et al. ............................... | 362/265 |
| 5,607,228 | 3/1997 | Ozaki et al. ............................. | 362/263 |
| 5,782,550 | 7/1998 | Ohashi et al. ............................ | 362/61 |

FOREIGN PATENT DOCUMENTS 5101703   4/1993   Japan .

Primary Examiner—Ira S. Lazarus
Assistant Examiner—Ljiljana V. Ciric
Attorney, Agent, or Firm—Sughrue, Mion, Zinn, Macpeak & Seas, PLLC

[57] ABSTRACT

A vehicle lamp having a discharge bulb which prevents radiation of electromagnetic waves toward the forward positions of the lamp. Radiation into the other directions is prevented by shielding members disposed around the lamp. A shade disposed in front of a discharge bulb attached to a reflector is made of metal and a stem of the shade is secured to the reflector in a state where the stem is electrically connected to a socket fixture. The shade is placed at ground potential through the fixture. Thus, the front portion of the discharge bulb is shielded and prevents radiation of the electromagnetic waves to positions in front of the lamp.

14 Claims, 11 Drawing Sheets

VEHICULAR LAMP HAVING DISCHARGE BULB

BACKGROUND OF THE INVENTION

1. Field of the Invention

The present invention relates to a vehicular lamp having a discharge bulb suitable to serve as a vehicular headlamp. More particularly, the invention relates to a vehicular lamp which is capable of preventing an influence of electromagnetic waves of a lamp of the type having a discharge bulb as a light source thereof.

2. Related Art

In recent years, there has been investigated a lamp, particularly as a headlamp, having a discharge bulb which performs an excellent light emission efficiency and color rendering characteristic and exhibiting a long life. Since a lamp of the foregoing type however requires high voltage in order to actuate the discharge bulb to discharge electricity, a circuit for turning on the lamp is required to be attached to the lamp in order to raise the voltage of a battery mounted on the vehicle to a required level. The circuit for turning on the lamp involves high voltage being generated on the secondary side thereof, thus causing electromagnetic waves to be radiated outwardly. The electromagnetic waves, as noise, affect on electronic devices of the vehicle, thus resulting in normal operation of the electronic device being inhibited. For example, noise is generated in a radio and noise is unintentionally mixed with signal systems of computers mounted on the vehicle for performing a variety of controls. As a result, an undesirable phenomenon EMI (Electromagnetic Influence), takes place.

Further, since the circuit for turning on the lamp involves high voltage being generated on the secondary side thereof, it is required to shorten the secondary side wire as much as possible in view of the safety measurement. In this context, generally the turning-on circuit is installed integrally with the lamp body. On the other hand, in a case where the lamp body is designed to be compact, if the lamp is a headlamp which requires an optical axis adjustment mechanism for a reflector, the lamp body must have a space for allowing the movement of the optical axis adjustment mechanism to move within the lamp body. Accordingly, if the lamp body is designed to be compact, it is difficult to maintain a sufficient space for installing the turning-on circuit within the lamp body. Therefore, the turning-on circuit must be attached to the exterior of the lamp body. However, if the turning-on circuit must be attached to the exterior of the lamp body, the electromagnetic waves due to the high voltage generated by the turning-on circuit irradiate to the outside the lamp body. The electromagnetic waves generate noise which causes the afore-mentioned problems.

For this reason, the turning-on circuit is accommodated in a metal casing or the like having a shield effect to eliminate the irradiation of the electromagnetic waves. However, since a cord connecting the turning-on circuit to the discharge bulb extends to the outside the lamp body, the electromagnetic waves still irradiate from the connection code. It is not easy to avoid the irradiation of the electromagnetic waves. Further, the electromagnetic waves irradiate also from a connector portion of the connection code and the discharge bulb and also from the discharge bulb itself. It has been required to eliminates these extra irradiations of the electromagnetic waves.

Also electromagnetic waves of the above-mentioned type are generated in the discharge bulb to which the high voltage is applied. Electromagnetic waves generated by the discharge bulb cause the EMI to take place. Accordingly, a contrivance has been suggested in Unexamined Japanese Patent Publication No. Hei. 5-101703 which has a structure such that a shielding member for covering the discharge bulb is provided. The above-mentioned technique is structured to have the shielding member for inhibiting radiation of electromagnetic waves from the discharge bulb in order to prevent the EMI.

However, the above-mentioned conventional technique, which is effective in inhibiting radiation of electromagnetic waves from the discharge bulb, involves impossibility that the shielding member cannot be disposed in front of the discharge bulb, that is, in front of the lens of the lamp for outwardly emitting light generated by the discharge bulb. Therefore, electromagnetic waves radiated from the discharge bulb to positions in front of the head lamp cannot easily be shielded. As a result, electromagnetic waves radiated forward are reflected by the body of the head lamp or the body of the vehicle. Thus, reflection of the electromagnetic waves to the vehicle cannot be prevented and therefore the required effect of shielding electromagnetic waves cannot be obtained.

SUMMARY OF THE INVENTION

The present invention was made in view of the drawbacks accompanying the conventional lamp. Accordingly, an object of the present invention is to provide a vehicular lamp of a type having a discharge bulb serving as a light source which is capable of preventing radiation of electromagnetic waves to the positions in front of the lamp.

In order to achieve the foregoing object, according to one aspect of the present invention, there is provided a vehicular lamp having a discharge bulb, comprising: a discharge bulb serving as a light source; and a shade disposed in front of the discharge bulb so as to limit a range of light beam emitting from the discharge bulb, wherein the shade is made of a conductive material and maintained at a ground potential.

According to another aspect of the present invention, there is provided vehicular lamp having a discharge bulb, comprising: a reflector; a discharge bulb attached to the reflector through a socket fixture secured to the reflector; and a shade disposed in front of the discharge bulb to limit a range of light beam emitting from the discharge bulb and supported by the reflector, wherein the shade is made of a conductive material and electrically connected to the socket fixture, and the socket fixture is maintained at a ground potential.

A structure may be employed in which a metal film constituting a reflecting surface is formed on the inner surface of the reflector, the shade is supported by the reflector in a state where the shade is electrically connected to the metal film, and the socket fixture is electrically connected to the metal film.

Another structure may be employed in which the shade is integrally supported by the reflector in a state where a stem of the shade integrally formed with the shade is, together with the socket fixture, brought into contact with the socket fixture.

Still another structure may be employed in which a coating of a shielded cable connected to a lighting circuit for supplying high voltage to the discharge bulb is electrically connected to the socket fixture and the socket fixture is maintained at the ground potential through the coating.

Other objects, features and advantages of the invention will be evident from the following detailed description of the preferred embodiments described in conjunction with the attached drawings.

DESCRIPTION OF THE PREFERRED EMBODIMENTS

Figure 1:
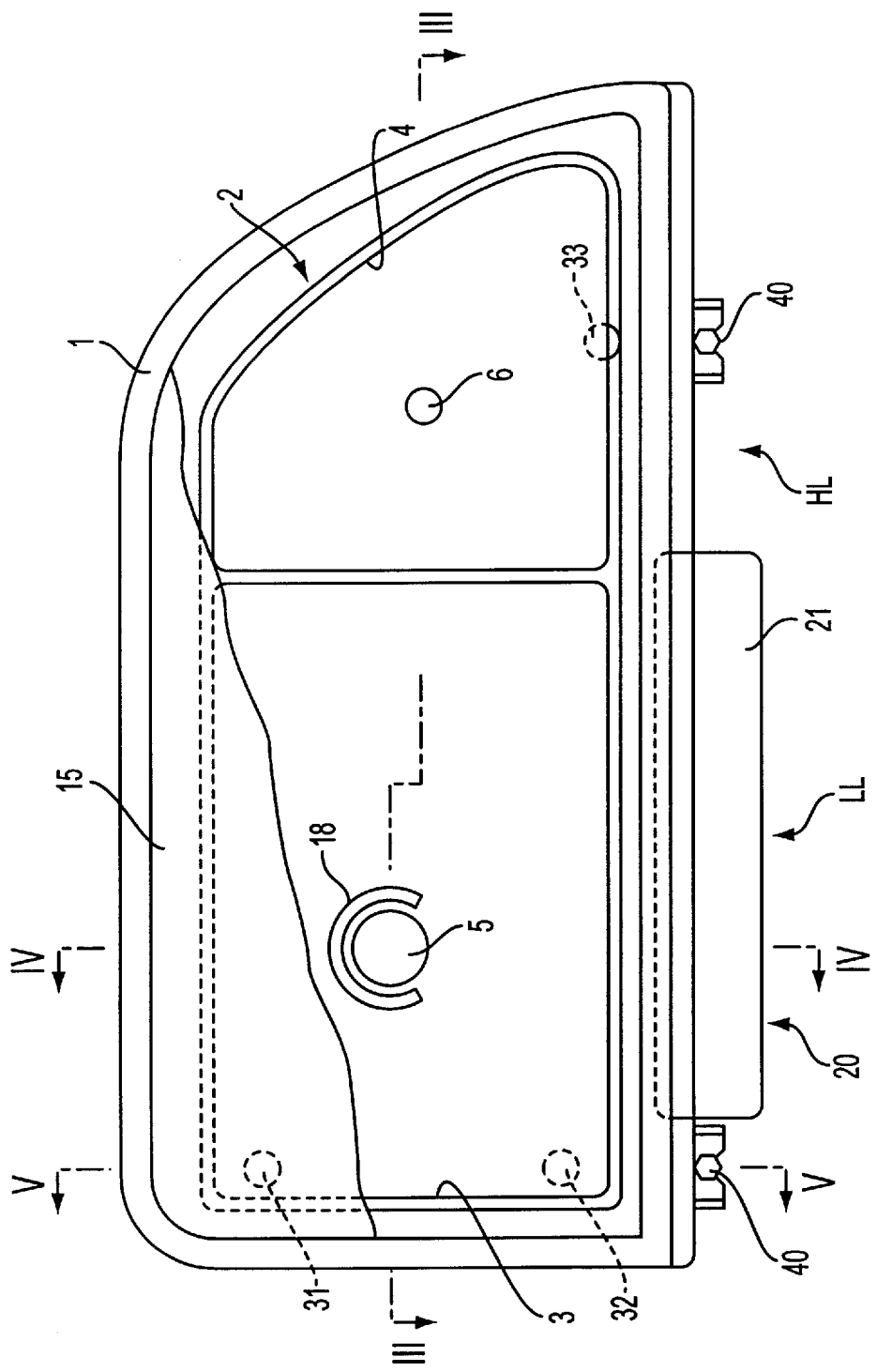
FIG. 1 is a partially broken front view showing a first embodiment of a structure of the present invention applied to a head lamp of a vehicle.
Figure 2:
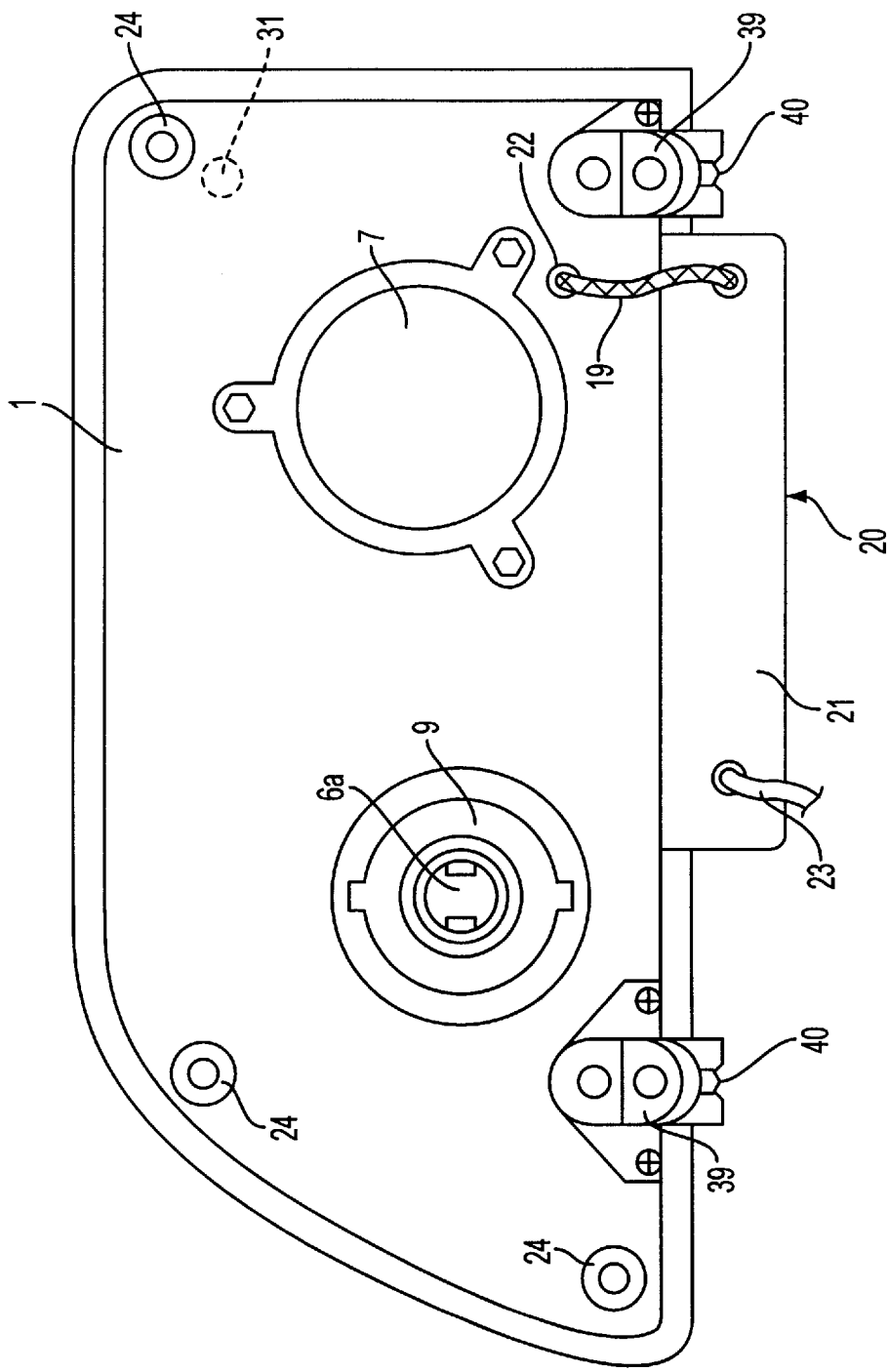
FIG. 2 is a rear view of FIG. 1.
Figure 3:
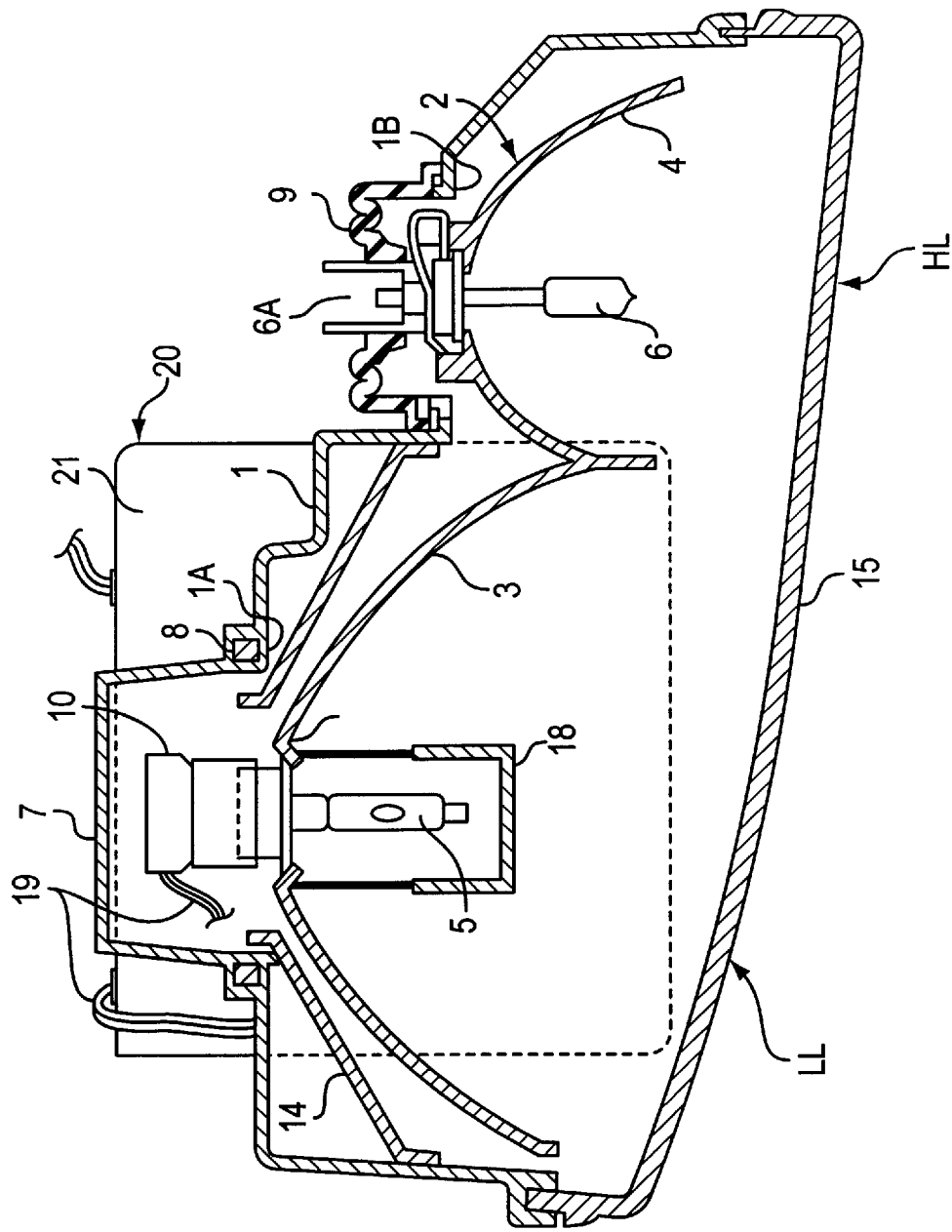
FIG. 3 is a cross sectional view taken along line III—III shown in FIG. 1.
Figure 4:
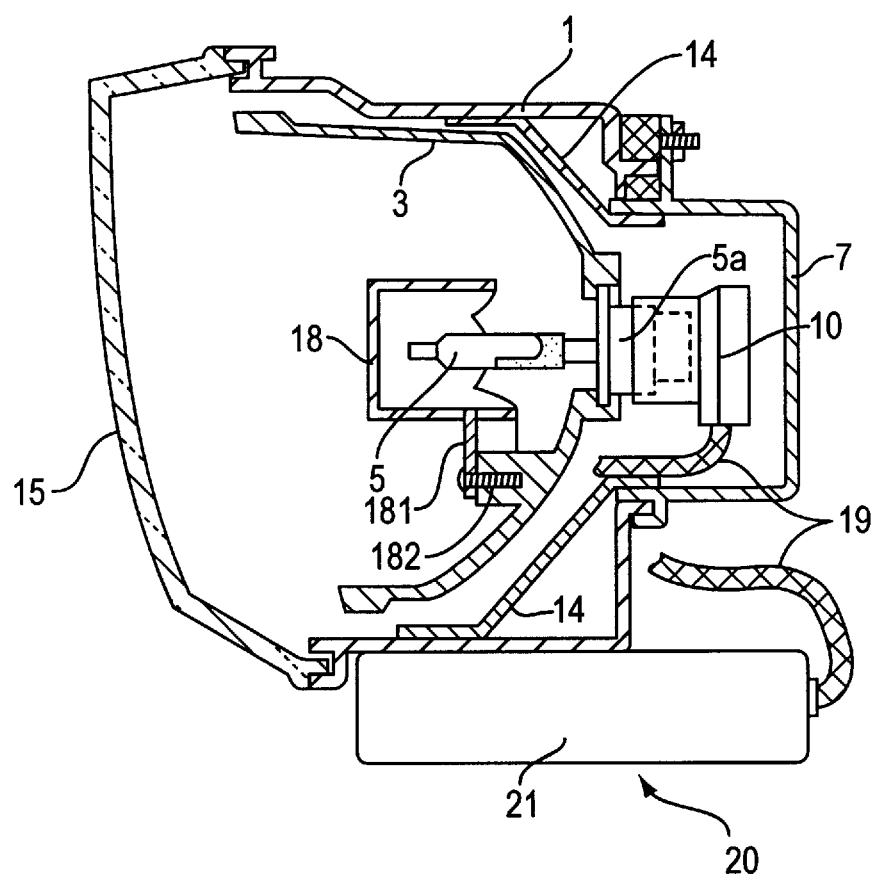
FIG. 4 is a cross sectional view taken along line IV—IV shown in FIG. 1.
Figure 5:
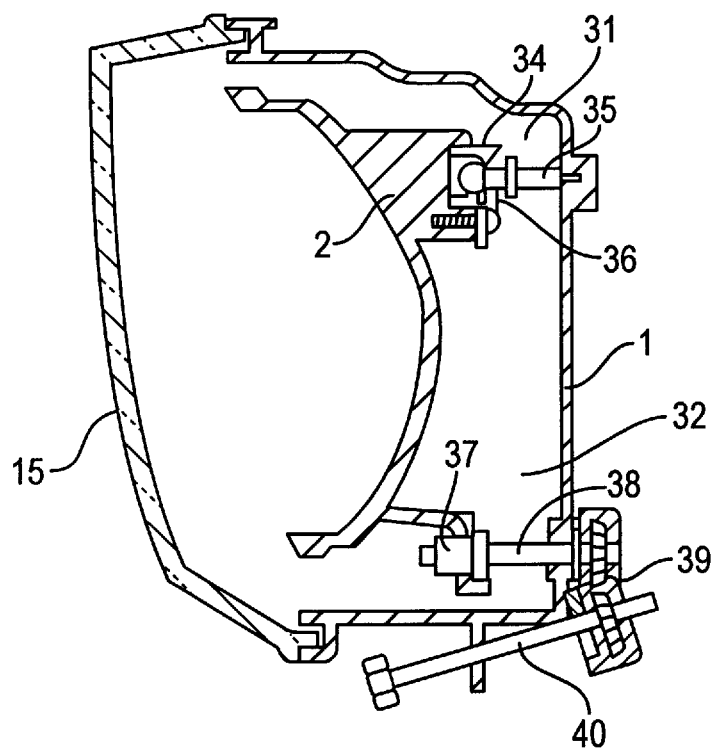
FIG. 5 is a cross sectional view taken along line V—V shown in FIG. 1.

Preferred embodiments of the present invention will now be described with reference to accompanying drawings. FIGS. 1 and 2 respectively are a partially broken front view and a rear view showing a first embodiment in which the present invention is applied to a four-light vehicular headlamp. FIG. 3 is a cross sectional view taken along line AA of FIG. 1. FIGS. 4 and 5 are cross sectional views respectively taken along lines BB and CC of FIG. 1.

Referring to the drawings above, a lamp body 1 includes a unified reflector 2 formed by, in parallel, disposing two reflectors 3 and 4 each having a shape of paraboloid of revolution. A discharge bulb 5 is detachably attached to the reflector 3 of the low beam lamp LL disposed in the outer portion of the car body when mounted on the vehicle, while a halogen bulb 6 is detachably attached to the reflector of a main beam lamp HL disposed on the inner portion of the car body.

Moreover, openings 1a and 1b, through which the bulbs 5 and 6 are inserted, are formed on the rear side of the lamp body 1 disposed opposite to the bulbs 5 and 6. Thus, the bulbs 5 and 6 can be attached and detached through the openings 1a and 1b. A detachable back cover 7 is, through a seal ring 8, attached to the opening 1a of the low beam lamp LL of the discharge bulb 5. On the other hand, a rubber cover 9 is attached to the opening 1b of the main beam lamp HL. Thus, the openings 1a and 1b are shielded to be waterproofed. Note that a connector 10, to be described later, is connected to a socket 5a of the discharge bulb 5 of the low beam lamp LL. A socket connector 6a of the halogen lamp 6 of the main beam lamp HL is outwardly projected over the rubber cover 9. A connector (not shown) is connected to the socket connector 6a.

Figure 7:
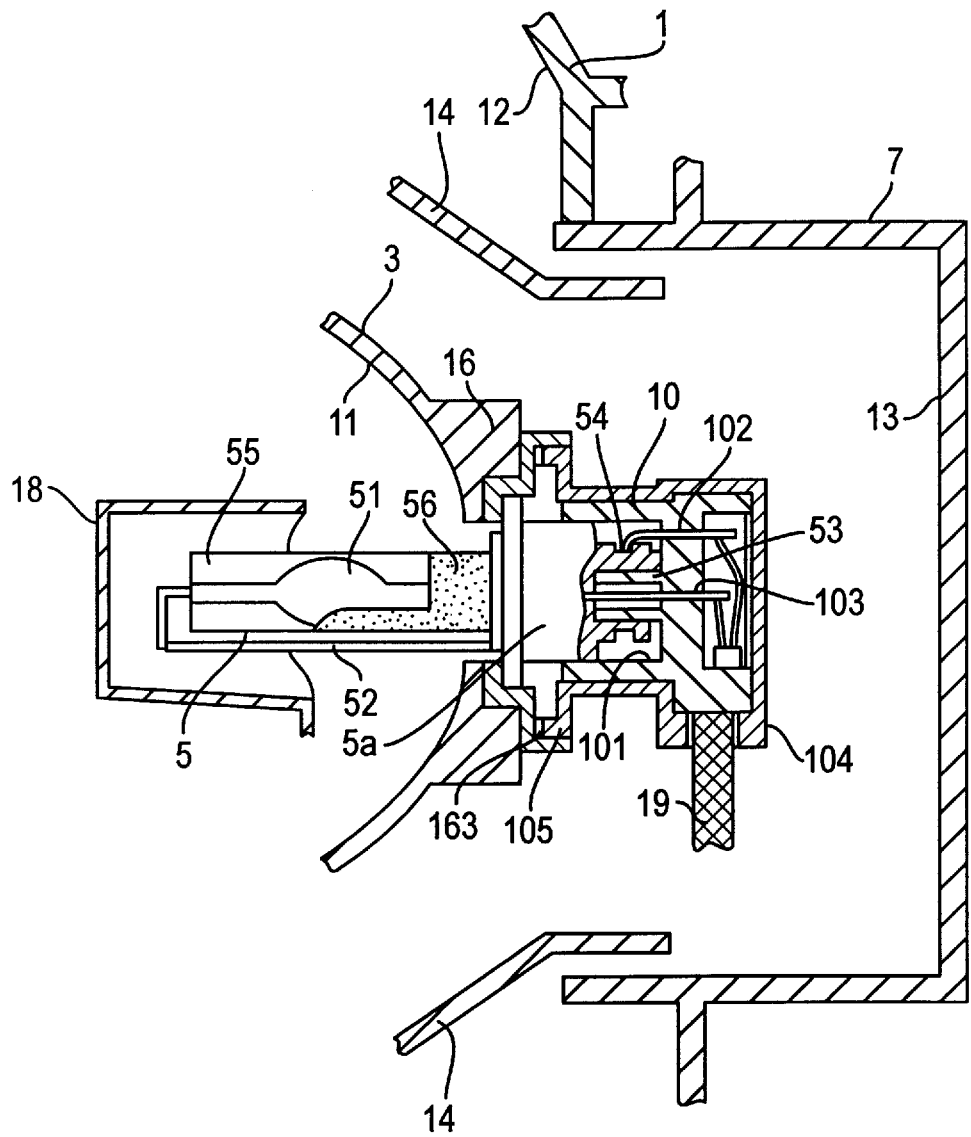
FIG. 7 is a cross sectional view showing an assembled state of FIG. 6.

An aluminum film 11 is coated or evaporated on the inner surface of the unified reflector 2, that is, each of the reflectors 3 and 4 so that a reflecting surface is formed (see FIG. 7). Also aluminum films 12 and 13 are applied or evaporated on the inner surfaces of the lamp body 1 and the back cover 7, respectively. The inner surfaces are used as portions of the reflecting surface or pseudo-reflectors. Also the inner surfaces above are used as shielding films for electromagnetically shielding the inside portion of the lamp body 1. In order to improve the shielding effect, a shield plate 14 formed by bending a metal plate is secured to the inner surface of the lamp body 1 around the discharge bulb 5 by screws or an adhesive agent. A lens 15 is attached to a front opening of the lamp body 1 so that lamp chambers for the low beam lamp LL and the main beam lamp HL are formed in the lamp body 1. Moreover, a stud bolt 24 for attaching the lamp to the car body is stood erect on the rear side of the lamp body 1.

Figure 6:
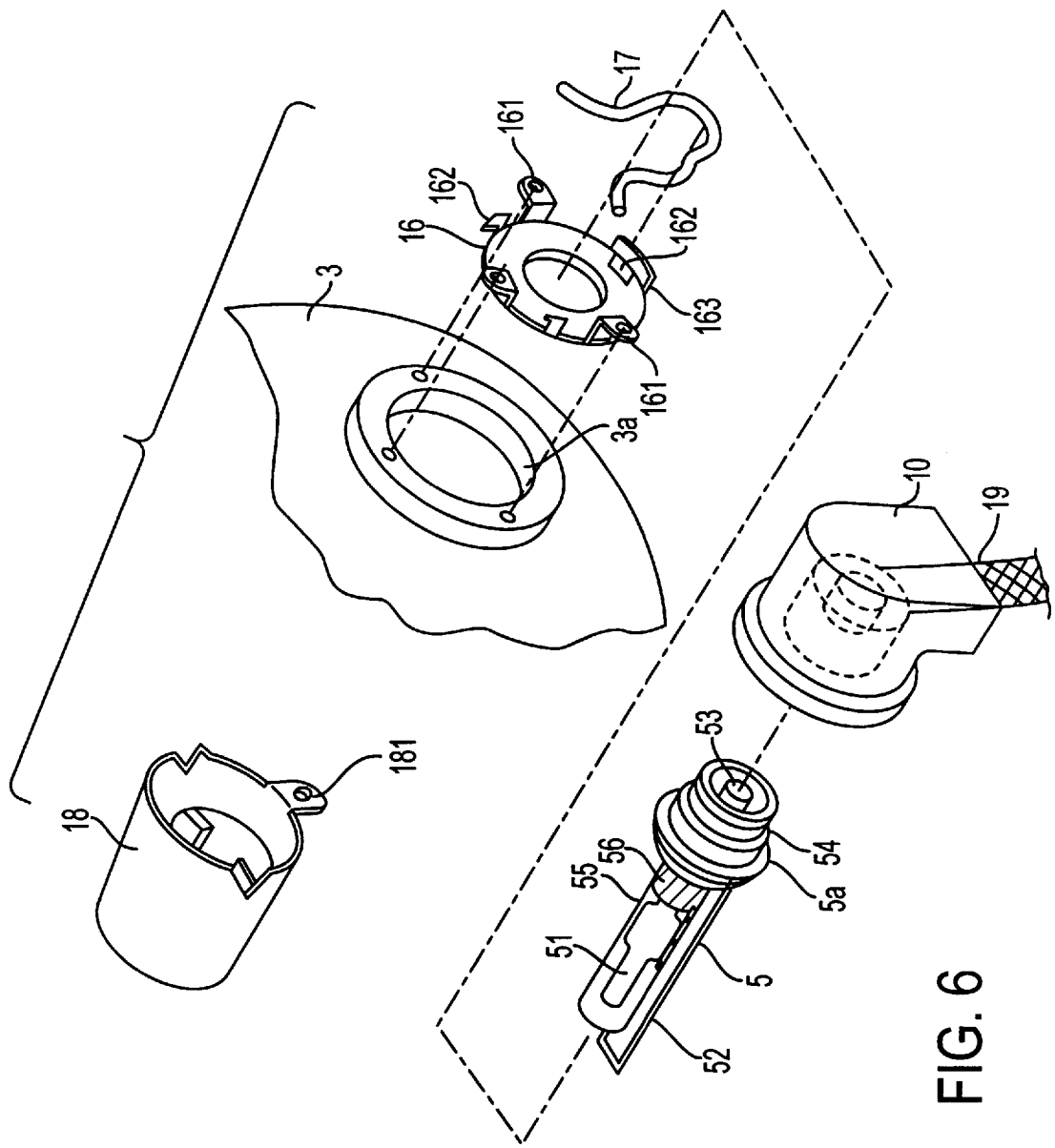
FIG. 6 is a partially broken perspective view showing an essential portion of the structure according to the first embodiment of the present invention.

As shown in FIG. 6 which is a partially exploded perspective view of an essential portion of the reflector 3, and FIG. 7 which is an exploded cross sectional view showing the reflector 3 in a state where the same has been assembled, a socket fixture 16 manufactured from a metal plate is secured in a bulb attaching hole 3a of the reflector 3 to which the discharge bulb 5 has been attached. The discharge bulb 5 is attached to the socket fixture 16. The discharge bulb 5 has a cylindrical socket 5a from which a discharge 20 pipe 51 and a conductive support 52 are stood erect. An end of the discharge pipe 51 is connected to a first electrode 53 disposed in the central portion of the rear surface of the socket 5a. An end of the conductive support 52 is connected to a second electrode 54 disposed in a portion of the outer surface of the socket 5a. The discharge pipe 51 is, at another end thereof, electrically connected to another end of the conductive support 52. A transparent and cylindrical shroud 55 is attached to cover the discharge pipe 51. Conductive light-shielding coating 56 is applied to a portion of the shroud 55 to restrict regions of light emitted from the discharge pipe 51.

The socket fixture 16 is formed into a plate-like shape having a substantially annular shape, the socket fixture 16 having a plurality of tag portions 161 in the periphery thereof so as to be, with screws, secured to the bulb attaching hole 3a of the reflector 3. A portion of the socket fixture 16 is brought into contact with a portion of the aluminum film 11 when the socket fixture 16 is secured with screws so as to be electrically connected to the aluminum film 11. The socket fixture 16 may be electrically connected to the aluminum film 11 through the screws for securing the socket fixture 16. A plurality of hooks 162 for hooking a retainer spring 17, to be described later, are formed in the outer periphery of the socket fixture 16. Moreover, a projection 161 for establishing the electrical connection with the connector 10 is formed on the outer periphery of the socket fixture 16.

When the outer periphery of the front surface of the socket 5a of the discharge bulb 5 is brought into contact with the socket fixture 16 so as to be pressed by the spring force of the retainer spring 17 hooked by the hooks 162 of the socket fixture 16, the discharge bulb 5 is secured by the reflector 3 through the socket fixture 16. A shade 18 for obtained a required light distribution characteristic is disposed in front of the discharge bulb 5. The shade 18 is made of metal which is capable of shielding light. The shade 18 has a leg portion 181 projecting downwards from the lower portion of the shade 18 and, with screws 182, secured to a portion projecting over the front surface of the reflector 3. As a result, the shade 18 is, through the leg portion 181, electrically connected to the aluminum film 11 of the reflector 3. In this case, the shade 18 may be secured to a part of the socket fixture 16 to thereby electrically connect to the socket fixture, if desirable.

Moreover, the connector 10 is attached to the socket 5a of the discharge bulb 5, the connector 10 having a circular pit 101 which is capable of receiving the rear portion of the socket 5a. First and second terminals 102 and 103 respectively made of conductive springs are disposed in the central portion of the circular pit 101 and a portion of the inner surface of the same. Moreover, a metal cover 104 manufactured from a metal member and serving as a conductive coating is integrally formed with the outer surface of the connector 10. The metal cover 104 has a periphery 105 of the front opening thereof which is projected to a position more forward than the connector 10.

A cord 19 drawn from a lighting circuit 20 is connected to the connector 10. The cord 19 is a shielded cable manufactured by shielding twin-core internal conductive cables. The internal conductive cables respectively are connected to the first and second terminals 102 and 103 of the connector 10. The shielded cable is held by the surface of an insertion hole of the metal cover 104 so as to be electrically connected to the metal cover 104. When the socket 5a of the discharge bulb 5 is pushed in the circular pit 101 of the connector 10, the socket 5a is received by the connector 10. Simultaneously, the first and second electrodes 53 and 54 of the socket 5a are brought into contact with the first and second terminals 102 and 103 of the connector 10 so as to be electrically connected to each other. The periphery 105 of the front opening of the metal cover 104 is brought into contact with a projection 163 of the socket fixture 16 so as to be electrically connected to the same.

The lighting circuit 20 for applying high voltage to the discharge bulb 5 is formed by integrating a stabilizing circuit to which the voltage of the car battery is applied and a starter circuit for generating high voltage for turning the discharge bulb 5 on from the output voltage from the stabilizing circuit, the lighting circuit 20 being accommodated in a metal case 21. The case 21 for the lighting circuit 20 is, by a bracket or a bolt (not shown), secured to the lower surface of the lamp body 1, in particular, a position right under the low beam lamp LL having the discharge bulb 5. The cord 19 connected to the discharge bulb 5 is drawn from the case 21 for the lighting circuit 20, the cord 19 being then, with a waterproof rubber bushing 22, inserted into a cord insertion hole formed in the rear surface of the lamp body 1. Then, the connector 10 is connected to the leading end of the cord 19 disposed in the lamp body 1. The shielded coating of the cord 19 is electrically connected to a ground terminal provided for the lighting circuit 20. Note that a power supply cord 23, which is connected to a battery (not shown) mounted on the vehicle, is drawn from the case 21 for the lighting circuit 20.

A portion 31 for supporting an optical-axis adjustment mechanism is formed in the substantially central portion of the upper portion of the unified reflector 2. A portion 32 for vertically and laterally adjusting the optical axis is disposed right under the support-point portion 31, while a portion 33 for vertically adjusting the optical axis is disposed at a position inner than the portion 32 for vertically and laterally adjusting the optical axis. The optical-axis adjustment support-point portion 31 is, as shown in FIG. 5, formed by integrally attaching a pivot receptor 34 on the rear side of the unified reflector 2. A pivot stud 35 is stood erect from the lamp body 1 disposed opposite to the unified reflector 2. A pivot 36 at the leading end of the pivot stud 35 is received by the pivot receptor 34 so that a support-point portion for vertically and laterally moving the unified reflector 2 is formed.

As represented by the portion 32 for vertically and laterally adjusting the optical axis shown in FIG. 5, the portion 32 for vertically and laterally adjusting the optical axis and the portion 33 for vertically adjusting the optical axis, an adjusting nut 37 is placed on the rear side of the unified reflector 2. An adjusting screw 38 is held by the lamp body 1 placed opposite to the unified reflector 2 in such a manner that the adjusting screw 38 can be turned. The adjusting screw 38 is received by the adjusting nut 37. When the adjusting screw 38 is turned, the position, at which the adjusting screw 38 is received by the adjusting nut 37, is changed in the lengthwise direction. Thus, the unified reflector 2 can be inclined both vertically and laterally or vertically in such a manner that the optical-axis adjustment support-point portion 31 is used as the support point. In this embodiment, the adjusting screw 38 is, by a gear mechanism 39, connected to an optical-axis adjustment shaft 40 projecting in the direction of the front surface of the lamp body 1. When the optical-axis adjustment shaft 40 is rotated from a position in front of the lamp, the optical axis can be adjusted.

Since the lamp according to this embodiment has the structure such that the lighting circuit 20 is shielded by the metal case 21, electromagnetic waves are not outwardly radiated from the lighting circuit 20. Since the cord 19 drawn from the case 21 for the lighting circuit 20 and extended to the discharge bulb 5 comprises the shielded cable, also radiation of electromagnetic waves from the cord 19 can be prevented. Since the discharge bulb 5 has the structure such that the metal cover 104 provided for the connector 10 to serve as a conductive coating and the socket fixture 16, which is brought into electrical contact with the metal cover 104, respectively are made to be ground potentials, the rear portion and the portion around the discharge bulb 5 and the socket 5a are shielded. Therefore, radiation of electromagnetic waves from the discharge bulb 5 and the socket 5a into the rearward direction can be prevented.

Since the metal shade 18 is disposed in front of the discharge bulb 5 and the leg portion 181 of the shade 18 is electrically connected to the aluminum film 11 such that the shade 18 is electrically connected to the socket fixture 16 and the shade 18 is electrically connected to the metal cover 104 of the connector 10 so as to be the ground potential, the discharge bulb 5 is shielded by the shade 18 in also the forward direction. Therefore, radiation of electromagnetic waves can be prevented. In this case, also the conductive coating 56 applied to the shroud 55 surrounding the discharge pipe 51 of the discharge bulb 5 prevents radiation of electromagnetic waves from the discharge pipe 51 in this direction. Also the aluminum film 12 formed on the inner surface of the lamp body, the metal shield plate 14 and the aluminum film 13 formed on the inner surface of the back cover 7 prevent radiation of electromagnetic waves to the outside of the lamp body 1.

If a required space is kept in the lamp body 1 to enable the adjustment of the optical axis of the unified reflector 2 to be performed and if the lighting circuit 20 is disposed on the outside of the lamp body 1 in order to reduce the size of the lamp body 1, radiation of electromagnetic waves generated by the lighting circuit 20, the cord 19, the discharge bulb 5 and portions around the foregoing elements in at least a direction toward the rear side of the lamp on which various electronic devices mounted on the vehicle are disposed can be prevented. As a result, mixture of noise in the radio of the vehicle and influences of electromagnetic waves on the other electronic devices can be prevented, In particular, forward shielding of the discharge bulb 5, which has been difficult, can be realized by the shade 18. Thus, forward radiation of electromagnetic waves can effectively be prevented so that the influence of electromagnetic waves on the vehicle is prevented.

Figure 8A:
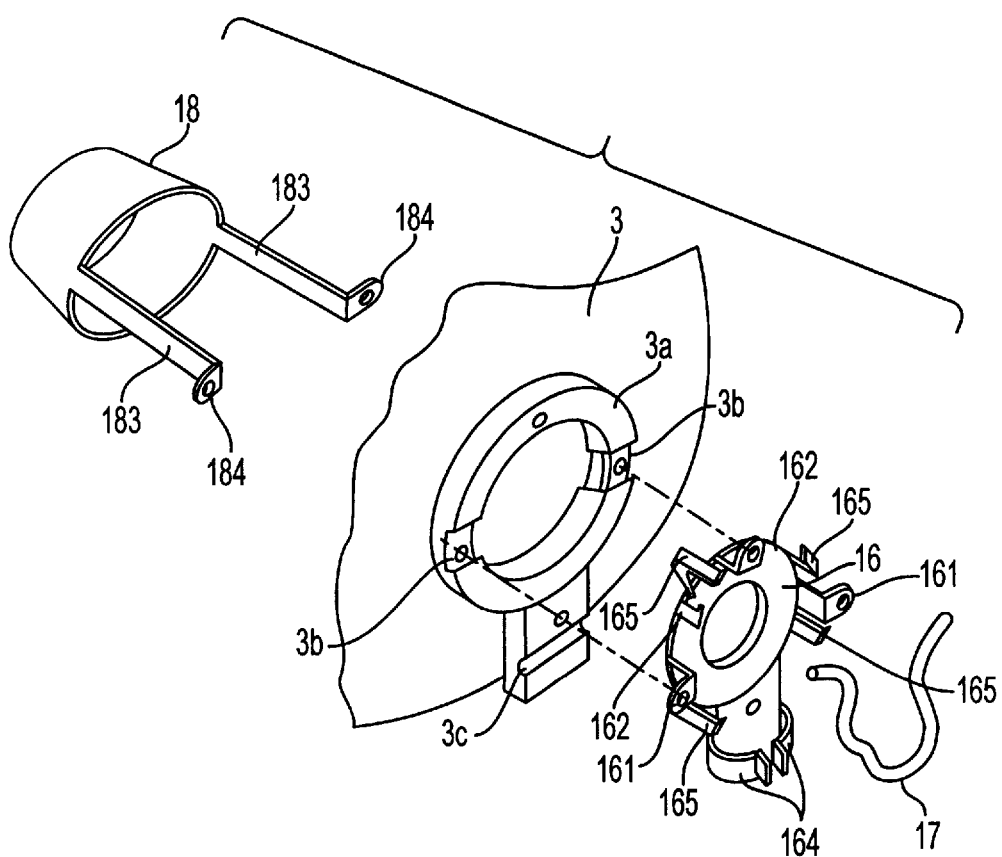
FIGS. 8A and 8B include a partially broken perspective view of an essential portion of a second embodiment of the present invention and a cross sectional view showing an assembled state of the same.
Figure 8B:
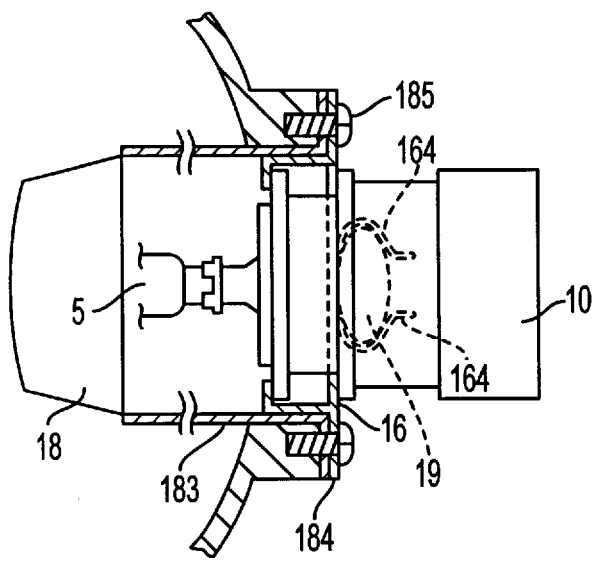

FIG. 8 is a diagram showing a second embodiment of the present invention. FIG. 8A is a partially exploded perspective view of a lamp according the second embodiment, and FIG. 8B is a cross sectional view showing a state where the lamp has been assembled. Referring to the drawings above, the similar elements as those of the foregoing embodiment are given the same reference numerals. The metal shade 18 is provided with a pair of stems 183 extending straight toward the rear portion of the lamp. The bulb attaching hole 3a of the reflector 3 has a recess 3b. Thus, a leading end 184 of the stems 183 is, from a position in front of the reflector 3, inserted into the bulb attaching hole 3a, and then disposed in the recess 3b. Then, the socket fixture 16 is secured to the bulb attaching hole 3a with a screw 185 from the rear side of the reflector 3. Thus, the leading end 184 is held between the bulb attaching hole 3a and the socket fixture 16. As a result, the shade 18 is electrically connected to the socket fixture 16 through the stems 183. Thus, the shade 18 can be maintained to the ground potential so that the effect of preventing the radiation of electromagnetic waves from the discharge bulb 5 is improved. The retainer spring 17 is received by a concave groove 3c formed in a portion projecting from the bulb attaching hole 3a in the radial direction in such a manner that the retainer spring 17 is pressed by the socket fixture 16.

The projection 163 provided for the socket fixture 16 shown in FIG. 6 may be formed by a pair of projections 164 each having a shape shown in FIG. 8. The projections 164 are used to wind and secure the cord 19 connected to the connector 10. As a result, the shielded coating of the cord 19 and the socket fixture 16 can reliably be electrically connected to each other. The shielded coating is, at an end thereof, electrically connected to the ground terminal provided for the lighting circuit 20. The other end of the shielded coating is electrically connected to the socket fixture 16 so that the two ends of the shielded coating are grounded. Thus, the shielding characteristic of the cord 19 can be improved so that the radiation of electromagnetic waves from the cord 19 is furthermore effectively prevented.

Figure 9A:
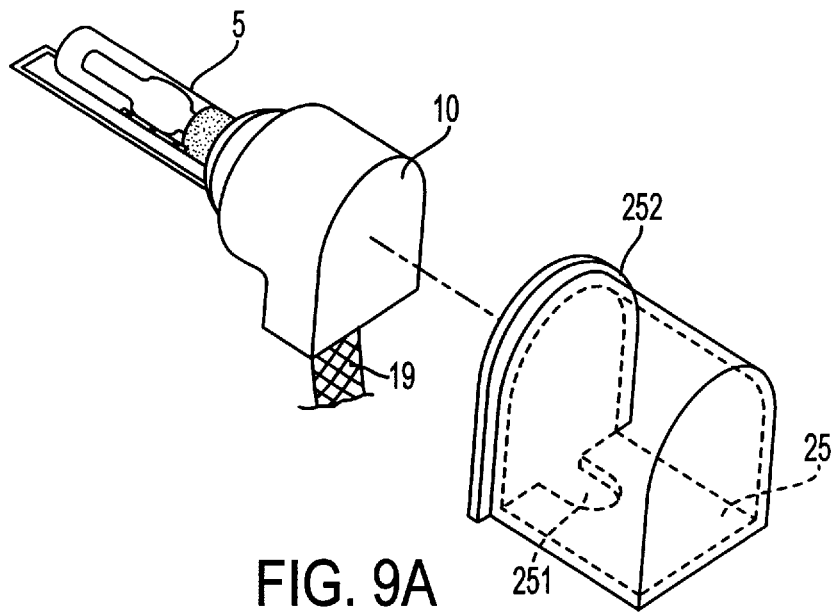
FIGS. 9A and 9B are cross sectional views showing the second embodiment of the connector cover and a state of assembly of the connector cover.

The metal cover provided integrally with the outer surface of the connector according to the above-mentioned embodiment may be formed by thickly applying conductive coating to the outer surface of the connector. As an alternative to this, the metal cover may be formed individually from the connector. For example, as shown in FIG. 9A, the connector 10 may have a structure having no metal cover and manufactured by molding usual resin. Moreover, a metal connector cover 25 molded individually from the connector 10 is mounted on the resin connector 10. In this case, the connector cover 25 is formed into a container shape having one opened side. A flange 252 formed at the periphery of the opening is elastically held by four engaging members 165 formed at the periphery of the socket fixture 16. Thus, the connector cover 25 is supported by the bulb attaching hole 3a of the reflector 3 at a position outside the connector 10.

Figure 9B:
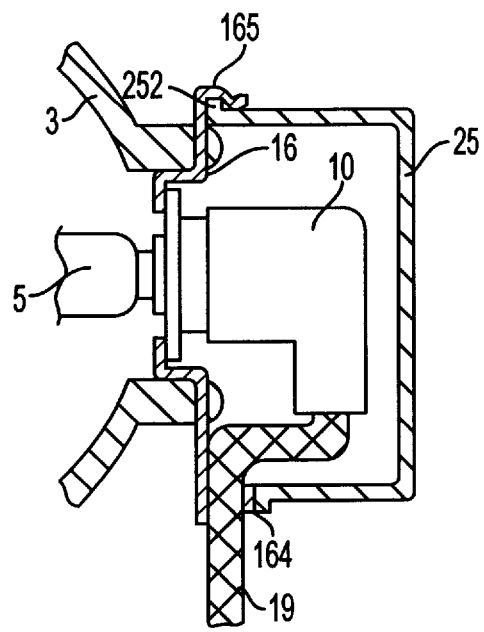

As shown in FIG. 9B showing the cross sectional structure, the cord 19 is received by a cut portion 251 formed in the lower surface of the connector cover 25. Then, the connector cover 25 is electrically connected to the periphery of the socket fixture 16 at the edge of the opening of the connector cover 25. Moreover, the connector cover 25 is also electrically connected to the shielded coating of the cord 19. In an example case shown in FIG. 9B, the lower end of the connector cover 25 is brought into elastically contact with the projections 164 so as to be electrically connected to the socket fixture 16 and the shielded coating of the cord 19. Also the connector cover 25 provided individually from the connector 10 attains the shielding effect similar to that obtainable from the foregoing embodiment if the 25 surrounds the connector 10.

Figure 10A:
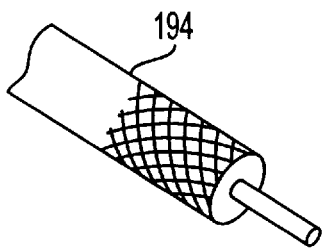
FIGS. 10A–10D include a perspective view and a cross sectional view showing modifications of the cord.
Figure 10B:
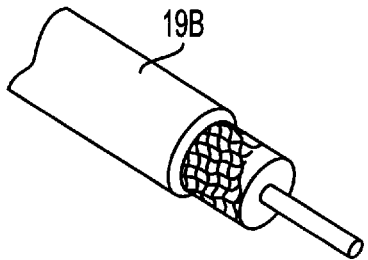
Figure 10C:
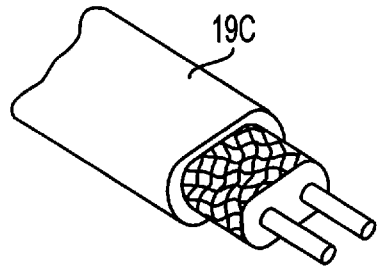

Although the above-mentioned embodiment has the structure such that cord is the two-core shielded cable, a mono-core shielded cable 19A may be employed such that two shielded cables 19A are disposed in parallel as shown in FIG. 10A. As an alternative to this, a mono-core structure having 10 a resin coating on the outside of the shielded coating and two-core shielded cable respectively shown in FIGS. 10B and 10C may be employed. Although the shielded coating is formed by a metal mesh made of conductive wires, the shielded coating may, of course, be made of metal foil.

Figure 10D:
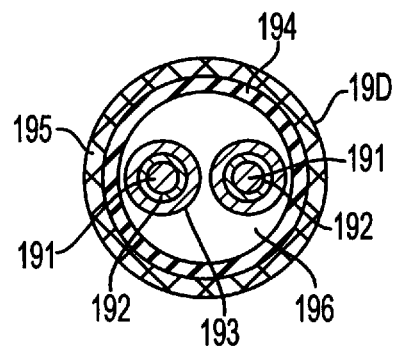

In the case where the two-core structure is employed, a cord 19D structured as shown in FIG. 10D may be employed in which each of shielded cables 191 is coated with an inner waterproof soft resin 192 and an outer heatproof soft resin 193; the two shielded cables 191 are inserted into a hollow tube 194 having a sufficiently large inner diameter and made of heatproof soft resin; and the tube 194 is covered with a metal mesh 195. Since the cord 19D has the double structure consisting of the tube 194 and the coating 193 each of which is made of heatproof resin, the heat resistance can significantly be improved. Moreover, the waterproof soft resin 192 improves the water resistance. Since a gap 196 is formed between the tube 194 and each core wire, the dielectric constant of air improves the voltage resistance. As a matter of course, the metal mesh 195 prevents electromagnetic waves.

Figure 11A:
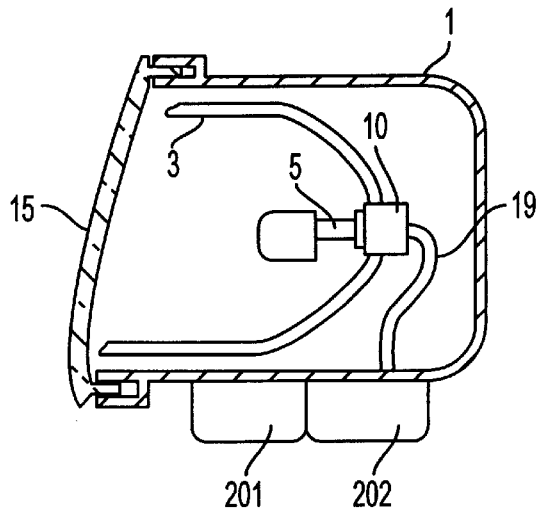
FIG. 11A–11C are cross sectional views showing a modification of the lighting circuit.
Figure 11B:
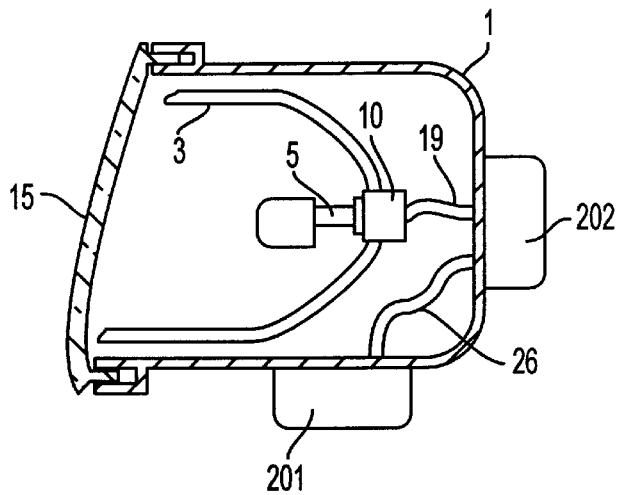
Figure 11C:
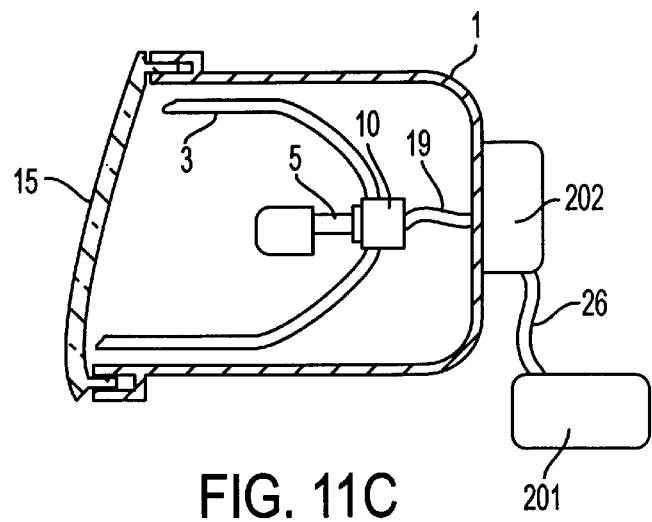

Although the above-mentioned embodiment has the structure such that the stabilizing circuit and the starter circuit for forming the lighting circuit is integrally included in one case 21 for the lighting circuit 20, a structure as shown in FIGS. 11A to 11C may be employed in which a stabilizing circuit 201 and a starter circuit 202 are accommodated in different circuit cases. In the structure shown in FIG. 11A, the stabilizing circuit 201 and the starter circuit 202 provided individually are disposed and secured in parallel on the bottom of the lamp body 1. In the structure shown in FIG. 11B, the stabilizing circuit 201 is secured to the bottom of the lamp body 1 and the starter circuit 202 is secured to the rear side of the lamp body 1. In the structure shown in FIG. 11C, the starter circuit 202 is secured to the rear side of the lamp body 1 and the stabilizing circuit 201 is secured to a portion of the car body individually from the lamp body 1.

In the structure shown in FIG. 11B, a connection cord 26 for connecting the stabilizing circuit 201 and the starter circuit 202 to each other is extended to the inside portion of the lamp body 1 so that radiation of electromagnetic waves from the connection cord 26 to the outside of the lamp body 1 is prevented and therefore the shielding effect is improved. In the structure shown in FIG. 11C, the connection cord 26 for connecting the stabilizing circuit 201 and the starter circuit 202 to each other is extended to the outside of the lamp body 1. A shielded cable as shown in FIG. 9 is employed as the connection cord 26 so that radiation of electromagnetic waves from the connection cord 26 is prevented and the shielding effect is obtained.

Although the foregoing embodiment has been described in which the present invention is applied to a four-lamp head lamp, the present invention may be applied to a two-lamp head lamp or a combination type head lamp formed by integrating a fog lamp, a clearance lamp and the like.

As described above, the shade disposed in front of the discharge bulb for limiting the range of light beam emitting from the discharge bulb is made of the conductive material and the shade is maintained at the ground potential. Therefore, electromagnetic waves radiated from the discharge bulb toward positions in front of the lamp can effectively be shielded so that the radiation is restricted and prevented. As a result, the EMI of the radio and the other electronic devices on the vehicle can effectively be prevented. Accordingly, even if the turning-on circuit is attached to the exterior of the lamp body to thereby keep a space for allowing the optical axis adjustment mechanism to move within the lamp body, the electromagnetic waves can be assuredly prevented from irradiating from the turning-on circuit. Therefore, a compact lamp body can be designed without raising a problem of electromagnetic waves.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A vehicular lamp comprising:
   a lamp body;
   a discharge bulb disposed in said lamp body serving as a light source; and
   a shade disposed in said lamp body in front of said discharge bulb so as to limit an illumination range for a light beam emitting from said discharge bulb, said shade being made of a conductive material and maintained at ground potential.

2. A vehicular lamp comprising:
   a reflector;
   a socket fixture secured to said reflector, said socket fixture being maintained at a ground potential;
   a discharge bulb coupled to said socket fixture; and
   a shade disposed in front of said discharge bulb to limit an illumination range of a light beam emitting from said discharge bulb, said shade being supported by said reflector, said shade being made of a conductive material and electrically connected to said socket fixture.

3. A vehicular lamp according to claim 2, further comprising a metal film forming a reflecting surface, said surface formed on an inner surface of said reflector, wherein said shade is supported by said reflector and said shade is electrically connected to said metal film, and said socket fixture is electrically connected to said metal film.

4. A vehicular lamp according to claim 2, wherein said shade is integrally supported by said reflector and a stem of said shade integrally formed with said shade is, together with said socket fixture, brought into contact with said socket fixture.

5. A vehicular lamp according to any one of claims 2 to 4, further comprising a shielded cable connecting to a lighting circuit for supplying high voltage to said discharge bulb, wherein said shielded cable comprises a coating that is electrically connected to said socket fixture and said socket fixture is maintained at the ground potential through said coating.

6. A vehicular lamp, comprising:
   a lamp body;
   a discharge bulb installed within said lamp body;
   a socket for said discharge bulb;
   a connector having an outside surface and connecting to said socket; and
   a conductive shield integrally formed with said outside surface and covering substantially all of the outside surface of said connector.

7. A vehicular lamp according to claim 6, further comprising a circuit for turning on said discharge bulb, a connection cord electrically connecting said circuit to said discharge bulb, and a shield film covering said connection cord, wherein said shield film electrically connects to said conductive shield of said connector.

8. A vehicular lamp according to claim 6 or 7, further comprising a reflector disposed within said lamp body and having a rear surface with an opening in said rear surface, a socket fixture formed of metal material attached to said opening formed in said rear surface of said reflector, wherein said discharge bulb is coupled to said reflector through said socket fixture and said socket fixture electrically connects to said conductive shield of said connector.

9. A vehicular lamp according to claim 8, further comprising a shade for limiting an illustration range for a light beam emitting from said discharge bulb, said shade being formed from a conductive material, and said shade electrically connecting to said conductive shield.

10. A vehicular lamp according to claim 6, wherein said conductive shield comprises at least one of a coating film made of conductive paint and a metal cap.

11. A vehicular lamp according to claim 7, wherein said shield of said cord comprises at least one of a metal mesh and a metal foil.

12. A vehicular lamp according to claim 7, wherein said turning on circuit is disposed at the exterior of said lamp body.

13. A vehicular lamp according to claim 12, wherein said turning on circuit comprises a stabilizer and a starter circuit, and a connection cord connecting said stabilizer and said a starter circuit.

14. A vehicular lamp according to claim 12, wherein said turning on circuit comprises a stabilizer and a starter circuit, and a connection cord connecting said stabilizer and said a starter circuit.

* * * * *